O. A. LOGAN.

ENVELOP FASTENER.

No. 11,585. Reissued Jan. 19, 1897.

Witnesses

A. W. Whiting

M. C. Price

Inventor

Oscar A. Logan

By his Attorney

Rufus B. Fowler

UNITED STATES PATENT OFFICE.

OSCAR A. LOGAN, OF CHICAGO, ILLINOIS.

ENVELOP-FASTENER.

SPECIFICATION forming part of Reissued Letters Patent No. 11,585, dated January 19, 1897.

Original No. 558,823, dated April 21, 1896. Application for reissue filed November 12, 1896. Serial No. 611,883.

*To all whom it may concern:*

Be it known that I, OSCAR A. LOGAN, a citizen of the United States, residing at Chicago, in the county of Cook and State of Illinois, have invented a new and useful Improvement in an Envelop-Fastener, of which the following is a specification, reference being had to the accompanying drawings, forming a part of the same, and in which—

Figure 1:
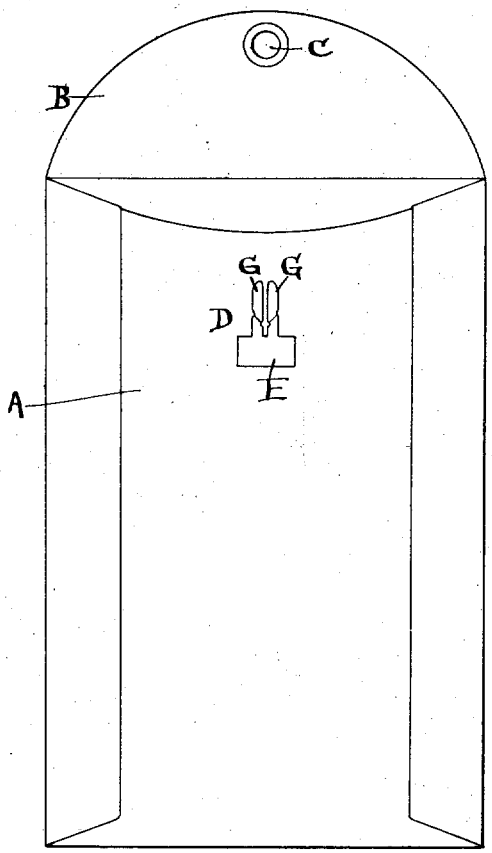
Figure 2:
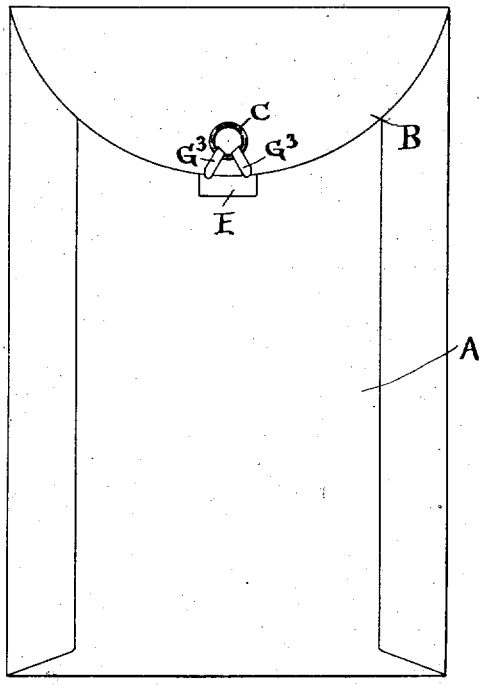
Figure 3:
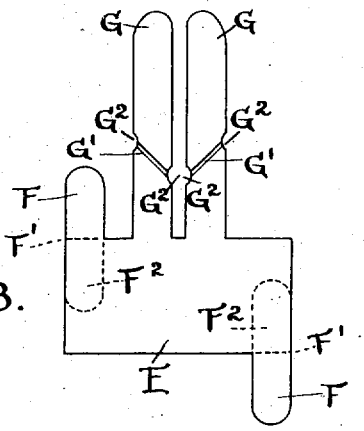

Figure 1 represents an envelop having one of my improved fasteners attached thereto and having its seal-flap open. Fig. 2 represents a portion of an envelop with its seal-flap closed and held in place by my improved fastener; and Fig. 3 represents, upon a larger scale, one of my improved envelop-fasteners before it is attached to the envelop.

Similar letters refer to similar parts in the different figures.

My invention relates to a metallic envelop-fastener for closing the seal-flaps of that class of envelops known as "merchandise-envelops," made of heavy material with ungummed seal-flaps; and it consists in the features of construction hereinafter described, and specifically pointed out in the annexed claims.

Referring to the drawings, A denotes the body of the envelop; B, the seal-flap, provided with a metallic eyelet C. Upon the body of the envelop I attach my improved metallic fastener D, formed of sheet metal and consisting of a head E, having upon diagonally opposite corners the projecting spurs F F, which are bent at right angles to the head E on the broken lines F′, Fig. 3, and inserted through slits formed in the body of the envelop. The prongs F are then bent down upon the under side of the envelop into the position indicated by the broken lines $F^2$, Fig. 3, thereby securely attaching the head E of the fastener to the body of the envelop. Tongues G G project from one edge of the head E toward the seal-flap and in line with the eyelet C, so that when the seal-flap B is closed, as shown in Fig. 2, the ends of the metallic tongues G G can be inserted through the eyelet and the free ends of the tongues bent over, forming hooks to hold the seal-flap. The tongues G G are creased on the oblique lines G′ G′, and the edges of the tongues are preferably provided with semicircular notches $G^2$ $G^2$ located at the ends of the creases G′ G′.

The fastener D is attached to the body of the envelop in the proper location to bring the creases G′ G′ within the eyelet C when the seal-flap B is closed, so the metallic tongues G, when bent into the hooked form, will be bent on the oblique line G′ G′, making the ends of the tongues when bent divergent, as represented at $G^3$ $G^3$, Fig. 2, with the distance between the tips $G^3$ $G^3$ much greater than the diameter of the eyelet C and preventing the seal-flap from being lifted off the hooked ends of the fastener. When the tongues G have been inserted through the eyelet and bent as shown in Fig. 2, the notches $G^2$ upon the outer edges of the tongues will be engaged by the metallic eyelet and thereby aid in holding the seal-flap against the body of the envelop, although the notches $G^2$ can be omitted, if desired.

The oblique creases G′ G′ are stamped upon the tongues G G before the fastener is attached to the body of the envelop in order to determine the location of the bending; but the creases can be omitted and the two tongues G G bent over the eyelet in diverging directions, as represented in Fig. 2.

I am aware that it is not new to attach a base-plate to the body of an envelop provided with a bendable tongue adapted to be passed through an eyelet in the seal-flap of an envelop; also that it is not new to employ a fastener having two bendable tongues passing through an eyelet and bent in opposite directions, such a fastener having been shown in the patent to Gorman, No. 222,394, and I do not herein claim either of these forms of construction broadly.

In the envelop-fastener forming the subject of my present invention the tongues project from one side of the base-plate and in the same plane. The tongues lie side by side with their adjacent edges separated by a narrow slit, the eyelet being large enough to receive them, and the tongues when bent are made to diverge by being bent obliquely. The obliquity of the bend is determined by notches $G^2$ in the opposite edges of the tongues or by oblique creases G′, the object of the notches and creases being to weaken the tongues on an oblique line, and the tongues can be weakened by the employment of either notches or creases or by the use of both. The tongues G project from the edge of a rectangular head or base plate, having the attaching-spurs F at diagonally-opposite edges, so as to prevent the rocking of the head, and they are also placed the farthest from the center of the plate in order to offer a maximum resistance to the turning or rotation of the plate about a central axis at right angles to the face of the plate.

What I claim as my invention, and desire to secure by Letters Patent, is—

1. An envelop-fastener, consisting of a rectangular sheet-metal head, attaching-spurs projecting from opposite edges and at diagonally opposite corners of said head and a bendable tongue projecting from one edge of said head and at the central section thereof, said tongue being adapted to pass through an opening in the seal-flap of an envelop, substantially as described.

2. An envelop-fastener, consisting of a head, means for attaching said head to the body of an envelop and a bendable tongue projecting from said head, said tongue being weakened on a line passing obliquely across said tongue, in order to cause the tongue to bend on an oblique line, substantially as described.

3. An envelop-fastener, consisting of a head, means for attaching said head to the body of an envelop, a bendable tongue projecting from said head, said tongue having notches in its opposite edges, whereby said tongue is weakened on an oblique line, substantially as described.

4. An envelop-fastener, consisting of a sheet-metal head, means for attaching said head to the body of an envelop and a pair of parallel bendable tongues projecting from one edge of said head, said tongues lying in the same plane as said head and being separated from each other by a narrow slit and adapted to pass through an opening in the seal-flap of an envelop and be bent obliquely, whereby the ends of said tongues when bent are divergent, substantially as described.

5. An envelop-fastener, consisting of a sheet-metal head E, means for attaching said head to the body of an envelop, a pair of parallel bendable tongues projecting from one edge of said head, said tongues being separated by a narrow slit and lying in the same plane as said head and each of said tongues being weakened on oppositely-inclined lines in order to cause them to bend in divergent directions.

6. In an envelop-fastener, the combination of a head E, means for attaching said head to the body of an envelop, tongues G, G, extending from one edge of said head and lying in the same plane, said tongues being adapted to pass through an opening in the seal-flap of an envelop, and said tongues being provided with notches $G^2$, $G^2$, whereby said tongues are weakened on an oblique line, substantially as described.

OSCAR A. LOGAN.

Witnesses:
K. D. MERRIEL,
WILLIAM A. MUNSON.